United States Patent [19]
King et al.

[11] Patent Number: 5,589,973
[45] Date of Patent: Dec. 31, 1996

[54] OPTICAL ENCLOSURE FOR HIGH SPEED ROTATING BEAM DEFLECTOR

[75] Inventors: Gregg R. King, Londonderry, N.H.; John A. Morrell, Wakefield, Mass.; Lawrence S. Blake, Peabody, Mass.; Philip A. Rombult, Bradford, Mass.; Thomas K. Hebert, Groveland, Mass.

[73] Assignee: AGFA Division, Bayer Corporation, Wilmington, Mass.

[21] Appl. No.: 243,677

[22] Filed: May 16, 1994

[51] Int. Cl.$^6$ .................................................. G02B 26/08
[52] U.S. Cl. .......................... 359/214; 359/198; 359/212; 347/257
[58] Field of Search ...................... 359/196, 197, 359/198, 212, 213, 214, 200, 220, 221, 223, 225, 226; 346/108, 109, 160; 355/232, 233; 347/138, 257–260, 263

[56] References Cited

U.S. PATENT DOCUMENTS

| | | | |
|---|---|---|---|
| 4,367,912 | 1/1983 | Kitamura | 359/198 |
| 4,560,244 | 12/1985 | Ackerman | 359/220 |
| 4,607,908 | 8/1986 | Ishida et al. | 359/216 |
| 4,805,972 | 2/1989 | Tanaka et al. | 359/200 |
| 4,943,128 | 7/1990 | Takada et al. | 359/220 |
| 5,080,456 | 1/1992 | Katz et al. | 359/216 |

FOREIGN PATENT DOCUMENTS 0553698  8/1993  European Pat. Off. .

*Primary Examiner*—Paul M. Dzierzynski
*Assistant Examiner*—Darren E. Schuberg
*Attorney, Agent, or Firm*—Julie A. Krolikowski; John A. Merecki

[57] ABSTRACT

A non-rotating optical shield is generally cylindrical in shape and surrounds a rotating optical deflector to reduce airflow and optical distortion, as well as acoustic noise. A beam entrance aperture is provided in an end of the shield allowing an input beam to project onto the rotating deflector along the deflector's spin axis. The entrance aperture is sealed by a window to prevent air from being drawn into the shield by the action of the rotating optical deflector. The deflected beam exits the shield through a beam exit aperture in the side of the shield which is enclosed by an optical element. Clearances between the shield and the rotating deflector are minimal. The shield reduces temperature gradients in the surrounding air thus reducing optical distortions caused by changes in refractive indices of the deflector and surrounding air. An additional feature of the shield is a fan-like portion which extends radially outward from the cylindrical body portion of the shield at the beam exit aperture, to enclose the exit beam as it scans through as range of angles. The fan-like portion extends as far along the exit beam path as desired and advantageously reduces acoustical noise generated by the rotating optical deflector.

8 Claims, 5 Drawing Sheets

OPTICAL ENCLOSURE FOR HIGH SPEED ROTATING BEAM DEFLECTOR

BACKGROUND OF THE INVENTION

The invention is related to optical scanning systems using a high speed rotating optical element and more specifically, a rotating optical element that causes turbulent airflow, thermal effects, and pressure disturbances in its surrounding area, resulting in optical distortions and acoustical noise problems.

Optical scanners, such as those used in film recorders, operate at very high scan rates, causing the optical deflector to rotate through the air at very high speeds. The Reynolds number for a typical deflector rotating at 27,000 rpm approaches 60,000. The airflow therefore is in the turbulent regime and consequently optical and acoustical problems arise. The optical deflector generates heat from shearing the air and in a turbulent air flow regime, heat transfer occurs via macroscopic pockets of air at differing temperatures, resulting in non-uniform air temperature. This circumstance can cause optical errors since the refractive index of air changes with temperature change. This causes wavefront errors in the deflected beam which degrade the writing spot of the scanned beam at the image recording surface.

As the geometry of the optical deflector is seldom optimum for rotation, the spinning of the optical deflector often produces an offensive acoustic noise due to the pressure disturbances caused by the irregularly shaped deflector moving through the air. As the rotational rate of the optical scanner increases, the airflow around the optical deflector becomes increasingly turbulent, causing increased optical distortion and acoustical noise.

Another problem encountered in optical scanners is the fouling of the optical deflector by airborne contaminants. During operation, optical scanners tend to draw air in toward the spin axis of the optical deflector and discharge air out radially from the spinning optical deflector. Particles in the flowing air can both foul and corrode the mirror surface of the optical deflector over time, reducing the quality of the scanned beam.

Accordingly it is an object of the present invention to enclose a rotating optical deflector with a fixed (non-rotating) shield to reduce the airflow surrounding the optical deflector and thereby improve the image quality of a scanning system employing such a rotating optical deflector.

It is another object of the invention to reduce acoustic noise associated with a high speed rotating optical deflector.

It is another object of the invention to prevent contamination of an optical deflector by airborne contaminants and prevent corrosion of the deflector surface.

It is another object of the invention to equalize the air temperature surrounding the optical deflector.

It is another object of the invention to prevent reflections from an imaging surface from inadvertently being deflected by the optical deflector back to the imaging surface and causing unintentional imaging errors.

SUMMARY OF THE INVENTION

The invention comprises an optical scanner having an optical element, a motor for rotating the optical element about a spin axis, and enclosure means enclosing the optical element to reduce turbulent airflow surrounding the optical element. The enclosure also equalizes air temperature surrounding the optical element during rotation of the optical element by the motor.

BRIEF DESCRIPTION OF THE DRAWINGS

The features and objects of the invention will become apparent in the following description taken with the accompanying drawings, in which.

DETAILED DESCRIPTION OF THE INVENTION

Figure 1:
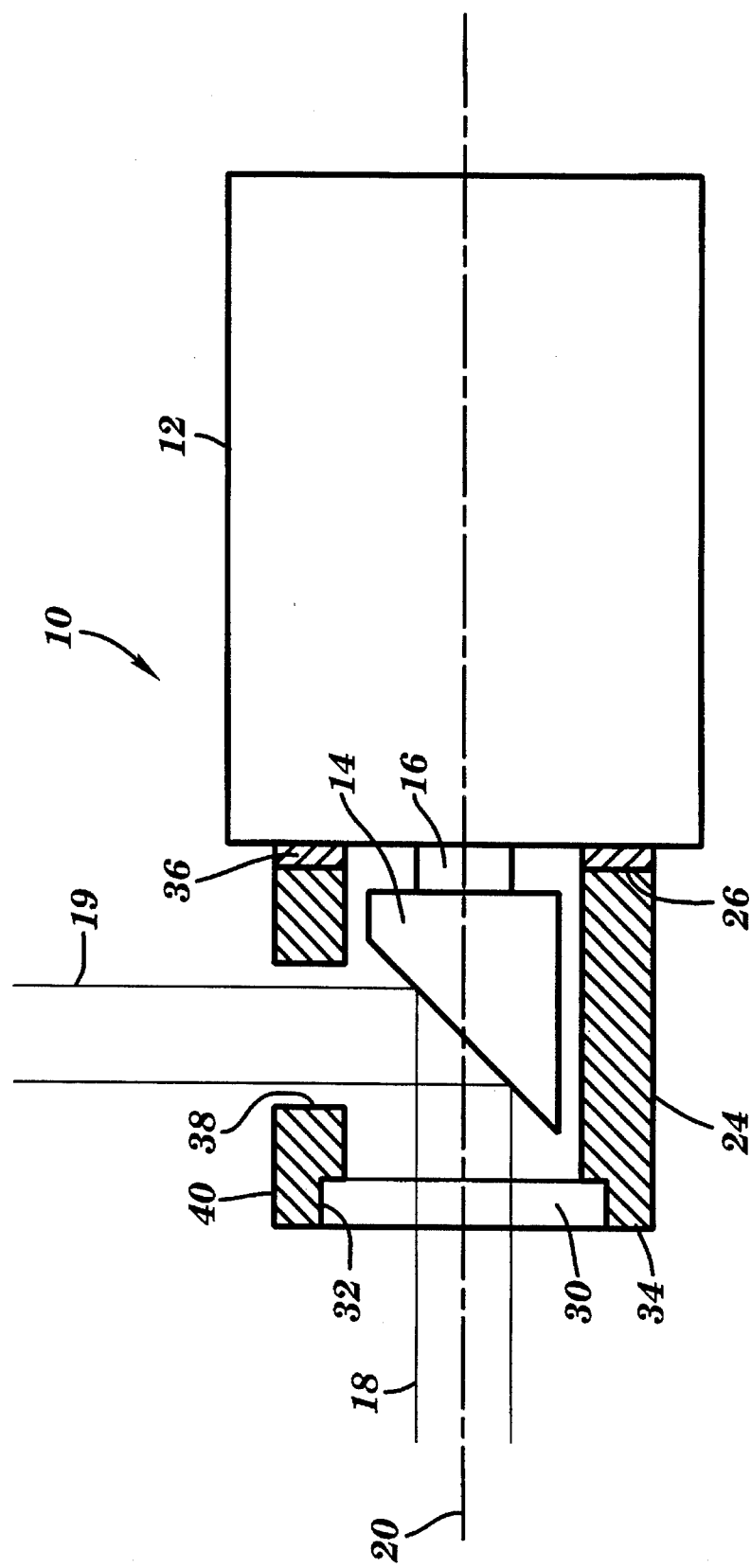
FIG. 1 is a side elevation view in partial section of an optical shield according to the present invention used in a rotating optical scanner.

Referring to FIG. 1, an optical scanner, generally referred to by reference numeral 10, is shown having a spin motor 12 for rotating an optical deflector 14. The deflector 14 is coupled to a spin motor shaft 16 to rotate therewith upon operation of the spin motor 12. An input beam 18 is shown directed toward the deflector 14 parallel to a spin axis 20 of the deflector 14. The input beam 18 is deflected by the optical deflector 14 and a resulting exit beam 19 is projected onto a scan surface (not shown) and scanned by the rotating deflector 14 in a sweeping motion, forming a scan line (not shown) on the scan surface.

Figure 2:
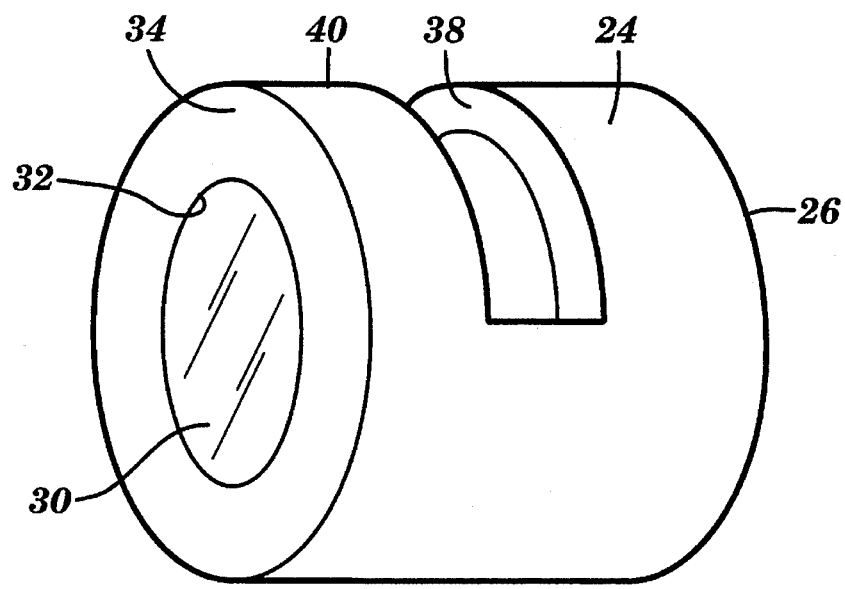
FIG. 2 is an isometric view of the optical shield of FIG. 1.

Referring to FIGS. 1 and 2, a hollow, non-rotating enclosure or shield 24 generally cylindrical in shape has a first end 26 abutting against the spin motor 12 to enclose the rotating deflector 14. The shield 24 extends longitudinally along the spin axis 20 and has an entrance window 30 affixed to a beam entrance aperture 32 at a second end 34 thereof. A seal 36 is provided at the interface of the first end 26 of the shield 24 and the spin motor 12. The entrance window 30 serves to seal the beam entrance aperture 32 of the shield 24. A beam exit aperture 38 on an outer radial portion 40 of the shield 24 is perpendicular to the spin axis 20 and extends along the perimeter of the cylindrical body of the shield 24, allowing the exit beam 19 to scan through a range of angles.

The shield 24 is made of a material such as aluminum, however can alternatively be made from plastic, metal, or a composite material. The geometry is made to closely and smoothly match the shape of the rotating deflector 14 so as to reduce the volume of air surrounding the deflector and minimize turbulence due to form drag. By enclosing the rotating optical deflector in the shield, pressure disturbances caused by the irregularly shaped rotating deflector are minimized, as is the associated acoustical noise. Further, the acoustical noise is reduced because the sound has less air volume to radiate through and the sound transmission must travel through the shield.

The shield reduces optical distortions of the beam in three ways. First, the air turbulence is reduced by the closely fitting shield around the deflector. The reduction in air turbulence corresponds to a reduction in optical distortions. Second, the temperature is more uniform due to an insulating effect of the shield. With less change in the temperature of the air surrounding the deflector, the beam being deflected is less likely to have wavefront errors because of a change in the refractive index of the surrounding air. Thirdly, with the shield being sealed at the beam entrance where air can be drawn in, fouling of the deflector is eliminated. By prohibiting corrosion and contamination of the deflector, scatter and absorption are less likely to occur so that the entire beam energy is deflected.

Figure 3:
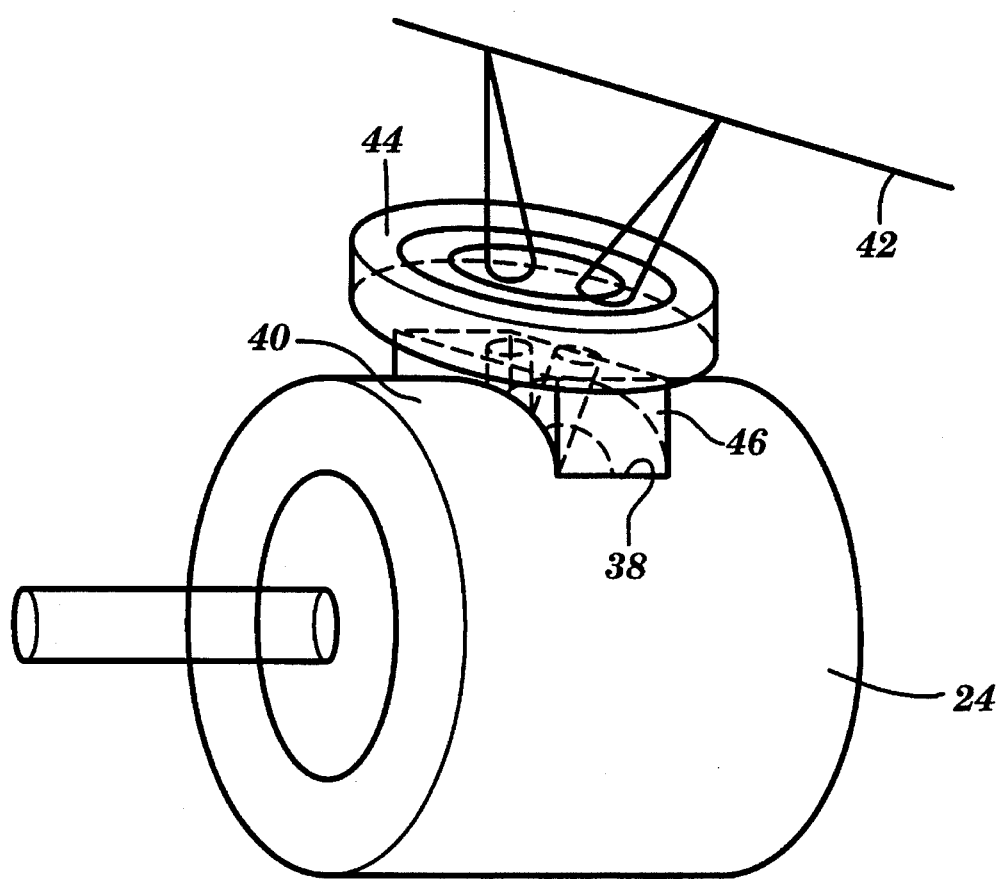
FIG. 3 is an isometric view of an embodiment of an optical shield used with an output lens typical of a capstan type imagesetter.

The optical shield described can be used in various types of imaging systems. In FIG. 3, the optical shield is shown in a capstan type imagesetter, where the output beam 19 is scanned onto a planar surface 42. An output lens 44 (F-θ lens) is provided at the beam exit aperture 38 on the outer radial portion 40 of the shield 24 and serves to seal the beam exit aperture 38 via an optical mounting member 46 which supports the output lens 44. The mounting member 46 is a hollow rectangular attachment to the optical shield 24 which extends outwardly from the beam exit aperture 38.

Figure 4:
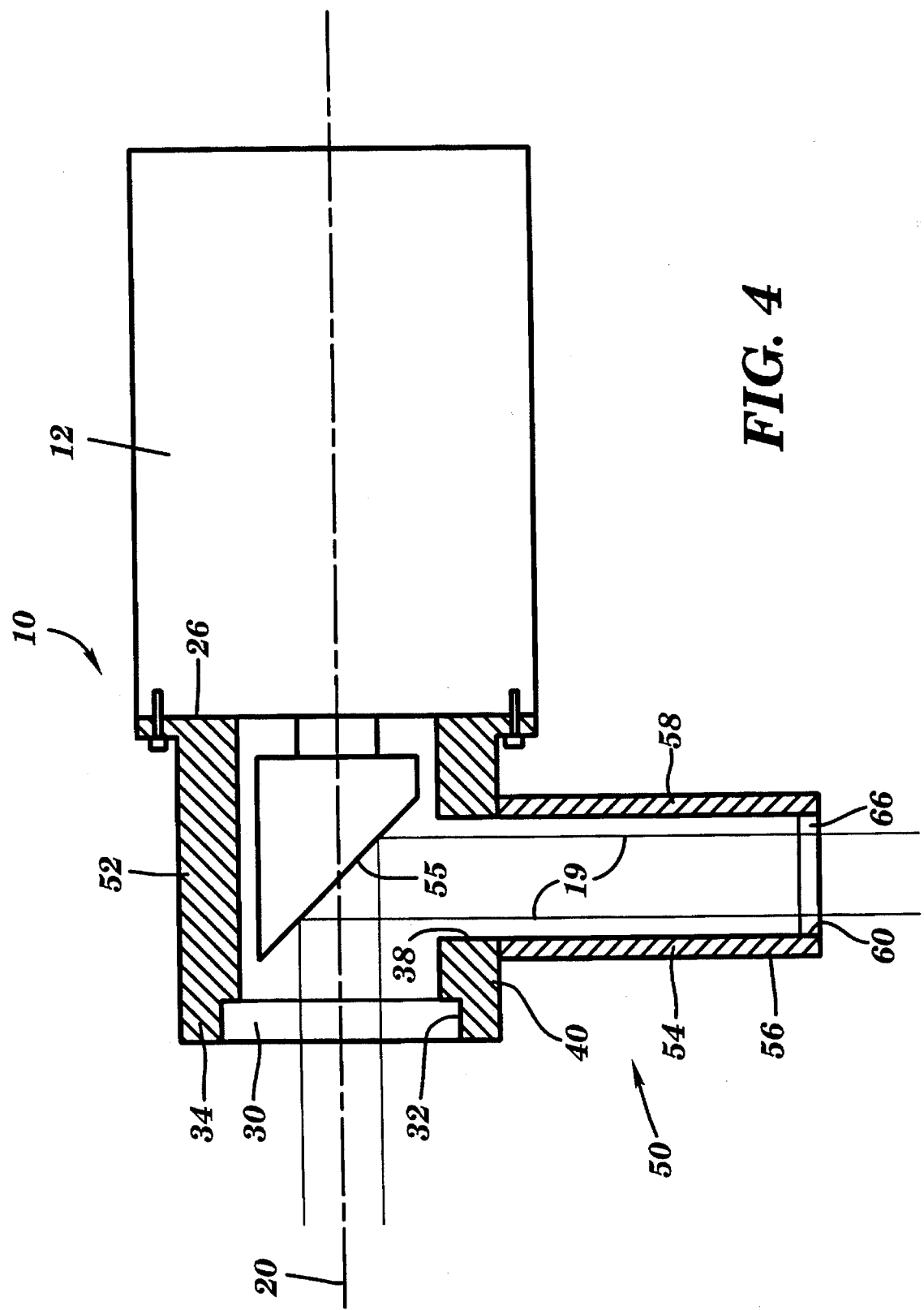
FIG. 4 is a side elevation view in partial section of another embodiment of an optical shield according to the present invention used in a rotating optical scanner.
Figure 5:
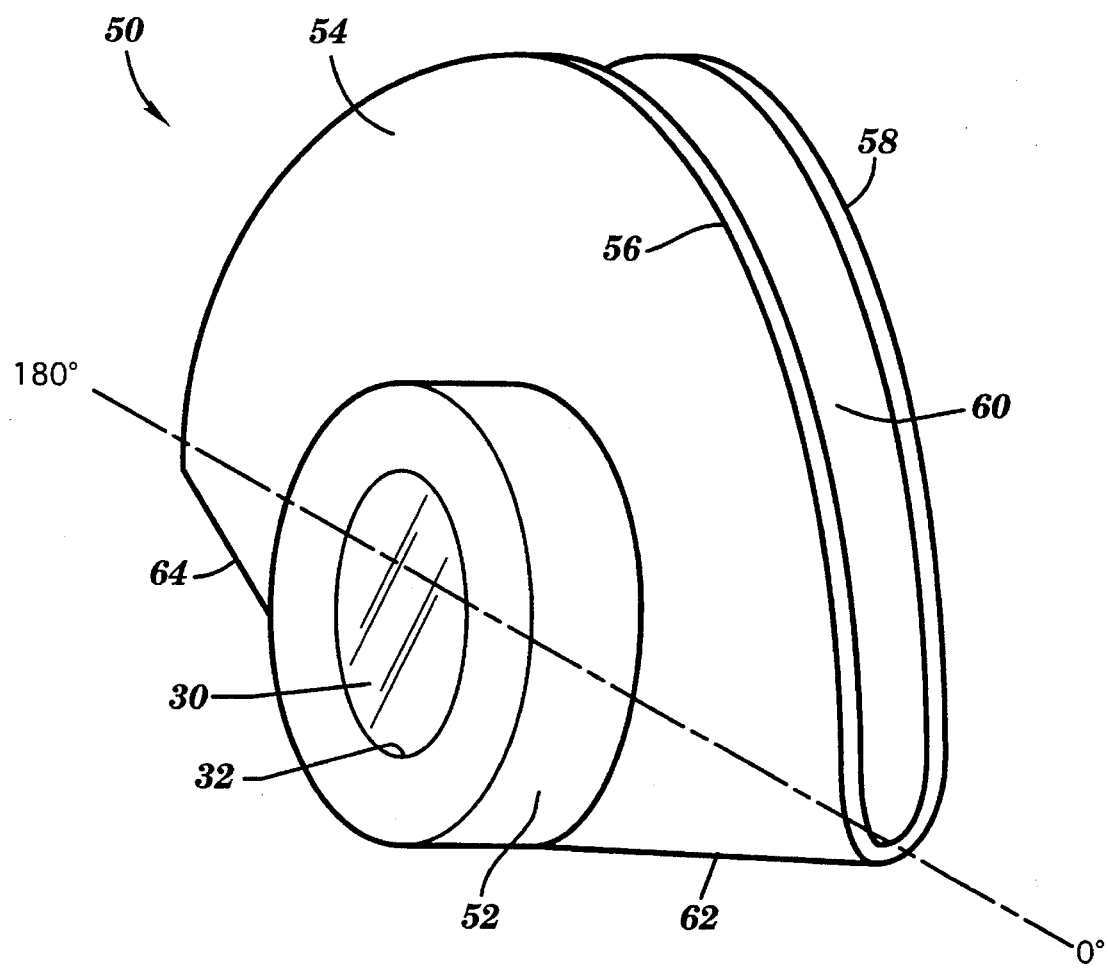
FIG. 5 is an isometric view of the optical shield of FIG. 4.

A preferred embodiment of the invention is shown in FIGS. 4 and 5 (with corresponding elements indicated by the same reference numerals as previously), having a hollow, non-rotating enclosure or shield, generally referred to by reference numeral 50, that has a cylindrical body 52 substantially identical to the previous embodiment, and a fan-like portion 54 extending radially outward from the cylindrical body 52. A first end 26 of the cylindrical body abuts against the spin motor 12. An entrance window 30 is provided at a beam entrance aperture 32 at a second end 34 of the cylindrical body 52, and serves to seal the shield 50. A beam et aperture 38 (FIG. 4) on an outer radial portion 40 of the cylindrical body 52 is perpendicular to the spin axis 20 and extends along half of the periphery, of the cylindrical body 52, allowing the exit beam 19 to scan from 0° to 180° when the angled surface 55 of the beam deflector rotates through the exit beam aperture. It will be appreciated that the beam exit aperture 38 may extend less or more along the periphery of the cylindrical body 52, depending on the angle which the beam is to be scanned through. The exit aperture 38 of the cylindrical body 52 has two fan-like members 56, 58 extending radially outward therefrom and ending at a beam exit slot 60. The fan-like members 56, 58 are spaced axially apart along the spin axis, allowing the exit beam 19 to project radially outward from the cylindrical body 52, in-between the fan-like members 56, 58. The two fan-like members 56, 58 are joined together in two areas 62, 64 extending outward on a tangent from the cylindrical body. The fan-like portion 54 extends radially with respect to the spin axis 20 over an area from a beginning of the exit beam aperture (0°) to an ending of the exit beam aperture (180°). The beam exit slot 60 can be left open or is preferably enclosed by a thin transmissive exit window 66 (FIG. 4). The fan-like members 56, 58 provide additional noise suppression. The design of the fan-like portion 54 has a smooth tapered shape 62, 64 as it extends out from the cylindrical body 52, which provides optimal imaging quality. The angled surface 55 of the rotating beam deflector pumps air within the shield 50. The tapered portions 62,64 provide an aerodynamic inner shield surface, minimizing optical distortion caused by pressure gradients in the surrounding air.

Figure 6:
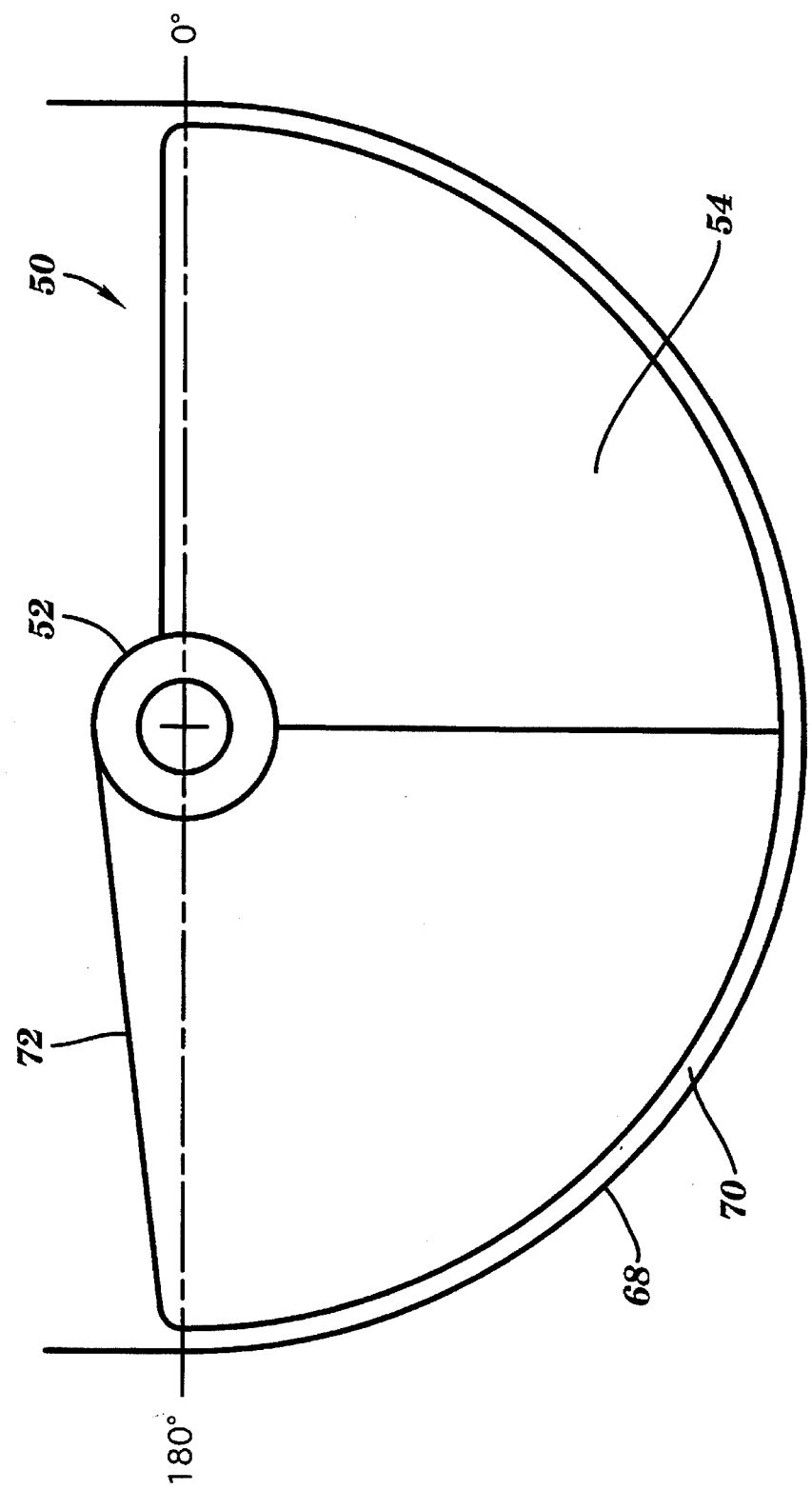
FIG. 6 is a front end view of an optical shield having an extended fan-like portion used in an internal drum imagesetter.

FIG. 6 shows a giant optical shield 50 used in an internal drum 68 imagesetter. The fan-like portion 54 extends to the maximum length along the beam exit path allowed by the configuration of the internal drum 68, while allowing clearance 70 for axial movement of the shield 50 along the inside of the drum 68. This particular configuration prevents undesirable reflections of the scan beam off of the scan surface 68 from reflecting back to the scanner hardware. Such inadvertent back reflections can in turn be reflected by the scanner hardware, causing arbitrary exposure of photosensitive media being imaged, resulting in undesirable artifacts in the image. The extended fan-like portion 54 allows the light beam from the beam deflector 55 (FIG. 4) to scan on the imaging surface 68 within the scan line being scanned, while eliminating artifacts in other scan lines due to any other unintentional light exposure to the media.

Additionally, heat near the surface of the drum 68 is distributed throughout the drum interior by the movement of the shield 50 and the enclosed optics across the drum surface 68. The shield 50 is moved across the drum surface 68 during the scanning process. Because the fan-like portion 54 extends as far as the drum surface, the heat is pushed away from the surface and distributed by the air movement outside of the shield 50 and by the thermal conductivity of the shield material. Therefore, the scan beam inside of the shield scans across a scan line in a more uniform temperature field. As a result, the undesirable effects of a non-uniform temperature field, as described above, are accordingly reduced, as are optical distortions resulting therefrom.

The giant shield embodiment is shown having one side of the fan-like portion 54 with a smooth tapered outer shape 72 as it extends out from the cylindrical body 52, as described in the previous embodiment. The tangential tapered design 72 is most beneficial on the side of the cylindrical body 52 where the beam deflector turns from scanning through the exit beam aperture 38 back into the cylindrical body portion 52 (left side as viewed in FIG. 6). For clockwise rotation of the angled reflective surface 55 (FIG. 4) of the beam deflector, the angled surface 55 turns out of the fan-like portion 54 on the left side and rotates back into the cylindrical body 52. Pressure is built up at the junction of the fan-like portion 54 and the cylindrical body 52 due to the pumping action of the angled surface 55. However the tapered design 72 minimizes the pressure and imaging quality is thereby maintained. Upon the angled surface 55 rotating back into the fan-like portion 54 of the shield 50 to scan through the exit beam aperture 38, there is little pressure build-up so a tapered surface is not required.

While this invention has been described in terms of various preferred embodiments, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What we claim and desire to secure by Letters of Patent of the United States are the following:

1. An optical scanning device comprising:
   a. optical means;
   b. rotation means for rotating said optical means about a spin axis;
   c. enclosure means surrounding said optical means for reducing imaging artifacts on scanned output from said optical scanning device, comprising a non-rotating hollow shield having entrance aperture means for allowing a light beam to enter said hollow shield and project onto said optical means, and exit aperture means for allowing the light beam to exit said hollow shield, said hollow shield having a substantially cylindrical body with a first end and a second end, and a longitudinal axis parallel to the spin axis of said optical means, said entrance aperture means provided at the first end of the cylindrical body with the longitudinal axis passing therethrough, said exit aperture means comprising a radial slot in a peripheral portion of said cylindrical body, said hollow shield mounted to said rotation means at the second end of said cylindrical body; and d. a hollow fan-like portion extending radially outward from said slot in said peripheral portion of said cylindrical body, comprising two fan-like members attached to opposing sides of said slot and extending outward therefrom in planes substantially parallel to the beam exiting said slot and extending substantially away from said cylindrical body thereby enclosing the beam exiting the slot between the two fan-like members of the hollow fan-like portion as the beam is rotated through an angle by said optical means.

2. The optical scanning device according to claim 1, wherein said optical scanning device is mounted within a cylindrical drum of an internal drum imagesetter with the spin axis of the optical means colinear with a longitudinal axis of the drum, and with said hollow fan-like portion extending into said drum so as to surround the beam being scanned radially on the drum by the optical scanning device.

3. The optical scanning device according to claim 2, wherein the hollow fan-like portion is generally perpendicular to the longitudinal axis of the drum and extends from the cylindrical body substantially to the drum providing a clearance amount between the fan-like portion and the drum.

4. The optical scanning device according to claim 3, further comprising optical glass window means for sealing said cylindrical body at said entrance aperture means.

5. The optical scanning device according to claim 2, further comprising optical glass window means for sealing said cylindrical body at said entrance aperture means.

6. The optical scanning device according to claim 1, further comprising optical glass window means for sealing said cylindrical body at said entrance aperture means.

7. The optical scanning device according to claim 1, further comprising window means for sealing said hollow shield at a radially outermost portion of said fan-like portion.

8. In an optical scanning device including a high speed rotating optical means and an internal drum, a method for reducing imaging artifacts on output from the optical scanning device, comprising the steps of:

a. rotating said optical means about a spin axis;

b. enclosing said optical means with a non-rotating hollow shield having an entrance aperture allowing a light beam to enter said hollow shield and project onto said optical means, and an exit aperture allowing the light beam to exit said hollow shield and to scan across the internal drum thereby producing the output;

c. enclosing the beam exiting the hollow shield between two fan-like members of an hollow fan-like portion of the hollow shield as the beam is rotated through an angle by said optical means onto said internal drum, thereby preventing back reflections of the beam off the drum from reflecting onto other portions of the drum and adversely affecting the output.

* * * * *